United States Patent
Iguchi et al.

(10) Patent No.: US 7,090,224 B2
(45) Date of Patent: Aug. 15, 2006

(54) SEAL DEVICE

(75) Inventors: Tetsuya Iguchi, Saitama (JP); Jun Hiromatsu, Saitama (JP); Toru Kono, Saitama (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 36 days.

(21) Appl. No.: 10/930,954

(22) Filed: Sep. 1, 2004

(65) Prior Publication Data
US 2005/0082768 A1    Apr. 21, 2005

(30) Foreign Application Priority Data
Sep. 2, 2003    (JP)    ............... 2003-309833

(51) Int. Cl.
F16L 21/05    (2006.01)
F16J 15/02    (2006.01)
F16J 15/08    (2006.01)
F03B 11/00    (2006.01)

(52) U.S. Cl. ............ 277/603; 277/637; 277/647; 277/650; 415/138; 415/174.2

(58) Field of Classification Search .......... 277/530, 277/566–567, 603, 626, 628, 637, 644, 647–650; 415/135–136, 138–139, 173.3, 174.2
See application file for complete search history.

(56) References Cited

U.S. PATENT DOCUMENTS

| | | | | |
|---|---|---|---|---|
| 2,701,155 A | * | 2/1955 | Estel, Jr. | ............... 277/555 |
| 2,776,865 A | * | 1/1957 | Anderson | ............... 277/481 |
| 4,494,762 A | * | 1/1985 | Geipel | ............... 277/614 |
| 5,354,072 A | * | 10/1994 | Nicholson | ............... 277/647 |
| 6,419,237 B1 | * | 7/2002 | More | ............... 277/602 |

* cited by examiner

Primary Examiner—Vishal Patel
(74) Attorney, Agent, or Firm—Arent Fox PLLC

(57) ABSTRACT

Primary objective of the present invention is to effect a seal against assembly clearances formed between components which admit flows of high temperature fluids or are subjected to vibrations. The seal device is comprised of a supporting member which has a first seal protrusion and a second seal protrusion wherein the seal protrusion is brought into sealing contact with a second slot surface of the one component, wherein the second seal protrusion is brought into sealing contact with a second symmetric slot surface of the other component, a retaining member which protrudes from the supporting member, a first seal member which includes a second side portion, a bight-shaped first elastic portion and a first side portion wherein the second side portion is fixed to the side wall of the retaining member, wherein the first side portion is at an angle, wherein the first seal member has a sheet form, a second seal member which includes a second side portion, a bight-shaped first elastic portion and a first side portion wherein the second side portion is fixed to the side wall of the retaining member, wherein the first side portion is at an angle, wherein the first seal member has a sheet form, wherein the second seal member is arranged symmetrically to the first seal member, a first seal surface which is defined at a distal end portion of the outer side surface of the first side portion wherein the first seal surface is brought into sealing contact with a first slot surface of the one component, and a second seal surface which is defined at a distal end portion of the outer side surface of the first side portion wherein the first seal surface is brought into sealing contact with a first symmetric slot surface of the other component, wherein the end sections of the both second side portions are fixed to the retaining member.

9 Claims, 12 Drawing Sheets

SEAL DEVICE

BACKGROUND OF THE INVENTION

1. Field of the Invention

The present invention relates to a seal device. More particularly, this invention relates to a seal device effecting a seal against gaps at the surfaces of assembly components when a distance between the surfaces varies under the influence of external forces, thermal deformation or the like. This invention, for example, relates to a seal device effecting a seal against the surfaces of assembly components subjected to thermal stress in a turbine assembly or the like.

2. Description of the Related Art

Turbine assemblies include turbine sections of steam turbines and assembly unit of compressor and turbine sections of gas turbines or the like. Turbine section 100 of a gas turbine includes moving blade assembly 110 which rotates with a rotor and stationary blade assembly which is fixed in a compartment (not shown). The moving blade assembly 110 consists of a platform 110A which is connected to the rotor and moving blades 110B. The stationary blade assembly, on the other hand, consists of stationary blades, an inner shroud and an outer shroud wherein the inner shroud and the outer shroud are fixed at the both ends of the stationary blades.

A blade surface of the stationary blade and the inner and the outer shrouds form a passage wall for high temperature gas flowing through the turbine part, and also a blade surface of the moving blade 110B and the platform 110A form a passage wall for high temperature gas. Furthermore, in the compartment, a division ring forming a passage wall for high temperature gas together with the blade surface of the certain space between a tip end of the moving blade 110B. The provision ring is formed of a plurality of division ring sections that are connected in the direction of arrangement of moving blade 110B, and forms a wall surface of a circular ring cross section as a whole.

The moving blade assembly 110 as well as the stationary blade assembly have to be arranged to tolerate thermal deformation caused by heat passing through between the blades. Also mounting of a plurality of blades on the shroud section requires the fabrication process to be straightforward. In addition, division of the parts involved is necessary in order to simplify the assembly process and to decrease the associated assembly cost. For these reasons, the moving blade assembly 110 and the stationary blade assembly are divided into a plurality of subassemblies along the circumferential direction of the rotor. That is, the platform sections 110A as well as the shroud sections, like the division ring, are arranged to include a plurality of divided pieces which are adjoined in the direction of arrangement of blade.

When the shroud sections, platform sections 110A and division ring sections are, respectively, connected in the peripheral direction of the rotor, it is necessary to previously keep a gap between the connected shroud sections, between the connected platform sections 110A, between the connected division ring sections. This is because the shroud sections, platform sections and division ring sections will expand by heat in also the peripheral direction due to exposure to high temperature gas, and it is desired to design so that these gaps will completely disappear in the state that these sections expand by heat. In other words, in the condition that high temperature gas flows through the passage formed by the blade surface, shroud, platform or division ring, the high temperature gas will leak outside from the gap formed between the connected platform sections and the like, which may cause decrease in turbine efficiency, or occurrence of unexpected failure at other portions outside the fluid passage by the high temperature gas which is burned gas.

As related art 1 of the present invention, U.S. patent No. 2002/0090296 discloses seal member, spline seal and seal assembly which are used in turbine sections of gas turbines or steam turbines. The seal member, spline seal and seal assembly are mounted at such locations of turbine sections where the assembly gaps of the shrouds or platform are forced to change by hot combustion gases, compression gases or vibratory force.

In U.S. patent No. 2002/0090296, as shown in FIG. 12, a "T"-sectioned seal member 102 is disposed in a gap 112 which is formed between side end surfaces 113, 113 of respective platform sections 110A, 110A. This seal member 102 prevents hot gases V from leaking outside through the gap 112. The seal members 102 are similarly utilized in the gap of segmented rings as well as in the gaps of shrouds. With such a simple "T"-sectioned seal member 102, however, a clearance still remains in the gap unless thermal expansion of the platform sections 110A, 110A causes the respective side end surfaces 113, 113 to be brought into close contact with the seal member 102, and so does leaking outside of the hot gases V. Further, the hot gases V induced into the gasp 112 may damage the side end surfaces 113, 113.

Relative art 2 is disclosed in U.S. Pat. No. 6,162,014 (not shown) in which opposing grooves are defined between the side end surfaces of the platform sections and a spline seal is disposed between the opposing grooves. This spline seal consists of a shim-layer assemblage made of metal surrounded by a cloth-layer assemblage. This spline seal, however, provides a seal against the platform gap in a similar manner to the relative art 1 that the spline seal is laid flat on the bottom surface of the opposing grooves therebetween. That is, the spline seal is configured in such a manner that the opposing groove and the spline seal are arranged in a non-contact state by taking thermal expansion of the platform sections into consideration. For this reason, a fluid-leak problem from the assembled components still arises as it does with U.S. patent No. 2002/0090296 as the relative art 1.

Further according to U.S. Pat. No. 6,193,240, another type of seal assembly is disclosed therein in place of the spline seal of the relative art 2 wherein the seal assembly includes a couple of bight-sectioned large spring leaves and the convex-shaped center sections of the spring leaves abut against each other in a symmetric manner in order to define contact surfaces at both distal sides thereof which come into close contact with the side surfaces of the mounting slot.

This seal assembly, like the relative art 2, is installed in a mounting slot which is defined by two opposing members. For this reason, the contact surfaces of the seal assembly and the abutting surfaces of the mounting slot are arranged to be in resiliently urged, sealing contact wherein the seal assembly includes two adjoined leaves and the respective contact surfaces at longitudinal ends of the leaves are formed by bending toward mutually opposite directions. Longitudinally located both end portions of the leaves in the seal assembly are arranged to stay in a non-contact state against the both bottom surfaces of the opposing slot in consideration of thermal expansion of the platform. For this reason, when a sealed fluid acts on the seal assembly, contact surfaces thereof are forced to lift away from the abutting surfaces to a non-contact state, which leads to a reduced protection against leaking of the sealed fluid and to a reduction of sealing ability. Therefore, even with the above described relative art 3, the seal assembly still is not free from the fluid leakage problem.

The present invention is introduced to resolve the above mentioned problems.

Technical problems which the present invention tries to resolve include improving seal ability of a seal device by maintaining sealing contact of seal surfaces thereof over a wide range of displacement under such circumstances that forces induced by thermal stresses, fluid pressures, vibratory forces or the like cause displacement to a distance between both contact surfaces which mount the seal device therein. Another goal is to assure sealing contact of the seal surfaces after merely mounting the seal device onto between the contact surfaces. Yet another goal is to make an installation of the seal device straightforward and to reduce assembly cost of the components.

BRIEF SUMMARY OF THE INVENTION

The present invention is made to alleviate the above technical problems and a solution to such problems is embodied as follows.

A seal device related to the present invention comprises is a seal device for effecting a seal at a connection space defined between an end surface of one component and an end surface of other component. The seal device is comprised of a supporting member which has a first seal protrusion and a second seal protrusion wherein the seal protrusion is brought into sealing contact with a second slot surface of the one component, wherein the second seal protrusion is brought into sealing contact with a second symmetric slot surface of the other component, a retaining member which protrudes from the supporting member, a first seal member which includes a second side portion, a bight-shaped first elastic portion and a first side portion wherein the second side portion is fixed to the side wall of the retaining member, wherein the first side portion is at an angle, wherein the first seal member has a sheet form, a second seal member which includes a second side portion, a bight-shaped first elastic portion and a first side portion wherein the second side portion is fixed to the side wall of the retaining member, wherein the first side portion is at an angle, wherein the first seal member has a sheet form, wherein the second seal member is arranged symmetrically to the first seal member, a first seal surface which is defined at a distal end portion of the outer side surface of the first side portion wherein the first seal surface is brought into sealing contact with a first slot surface of the one component, and a second seal surface which is defined at a distal end portion of the outer side surface of the first side portion wherein the first seal surface is brought into sealing contact with a first symmetric slot surface of the other component, wherein the end sections of the both second side portions are fixed to the retaining member.

According to the seal device related to the present invention, it has a "W"-shaped cross-section and a first seal surface and a second seal surface are defined on the outer side surfaces of the first side portions at distal end sections thereof. And the respective second side portions are connected to the retaining member by means of welding or the like. For this reason, when the first seal surface and the second seal surface are urged in the direction of closing the gap therebetween by a first slot surface and a first symmetric slot surface of the both mounting slot portions which are subject to external forces caused by deformation or the like due to thermal expansion, the entire longitudinal bodies of the first seal member and the second seal member can perform elastic deformation with respect to the joint portion of the retaining member as a fulcrum. Under this situation, the respective second side portions which are located closer to the elastic portion perform elastic deformation so that the second side portions move away from the side walls of the retaining member. This action allows the first seal surface and the second seal surface to exhibit outstanding seal performance by maintaining approximately a uniform surface pressure thereon despite a large displacement caused by a varying distance between the first slot surface and the first symmetric slot surface. Therefore, an effective seal capability can be expected over a wide range of displacement or fluctuation of the first seal surface and the second seal surface.

Further, since the first seal member and the second seal member are bent to a "U"-shape with respect to the joint portion as a fulcrum, the total length from the joint portion to the first seal surface and the second seal surface can be arranged long. Even if the second side portions of the respective seal members are arranged short for the reason of a compact design of the seal device 1, the seal surfaces are allowed to move in the direction of surface pressure by a large amount because of the stable installation of the seal members by means of the reinforcing retaining member and supporting member. For this reason, the first seal surface and the second seal surface are capable of effecting a seal against thermal deformation, pressure deformation, vibration-induced deformation or the like.

Further, the seal device can enjoy large elastic deformation at the first seal surface and the second seal surface as a cumulative effect of each length of the first side portion, the second side portion and the bight elastic portion therebetween. For this reason, the first side portion and the second side portion can be arranged short in their longitudinal direction, which enables the seal device to be installed in a small space of mounting slot. These advantages can be fully appreciated by the individual seal members being mounted in a seal main body in a stable manner. Furthermore, since the supporting member retains seal protrusions on its bottom surface, even when the mounting slot surfaces of one component and the other component form a step-like relative gap therebetween, the first seal member and the second seal member can be sustained by the supporting member through the retaining member and the seal ability is maintained. In addition, since the seal device is arranged such that the first seal member and the second seal member are fixedly retained in a "W"-shape by the retaining member which is integral with the supporting member, installation with the supporting member makes mounting of the device straightforward even for a mounting slot with a complex construction.

BRIEF DESCRIPTION OF THE DRAWINGS

Described below is details of the figures of preferred embodiments of a seal device constructed in accordance with the principles of the present invention. All the figures explained below are constructed according to actual design drawings with accurate dimensional relations.

Figure 1:
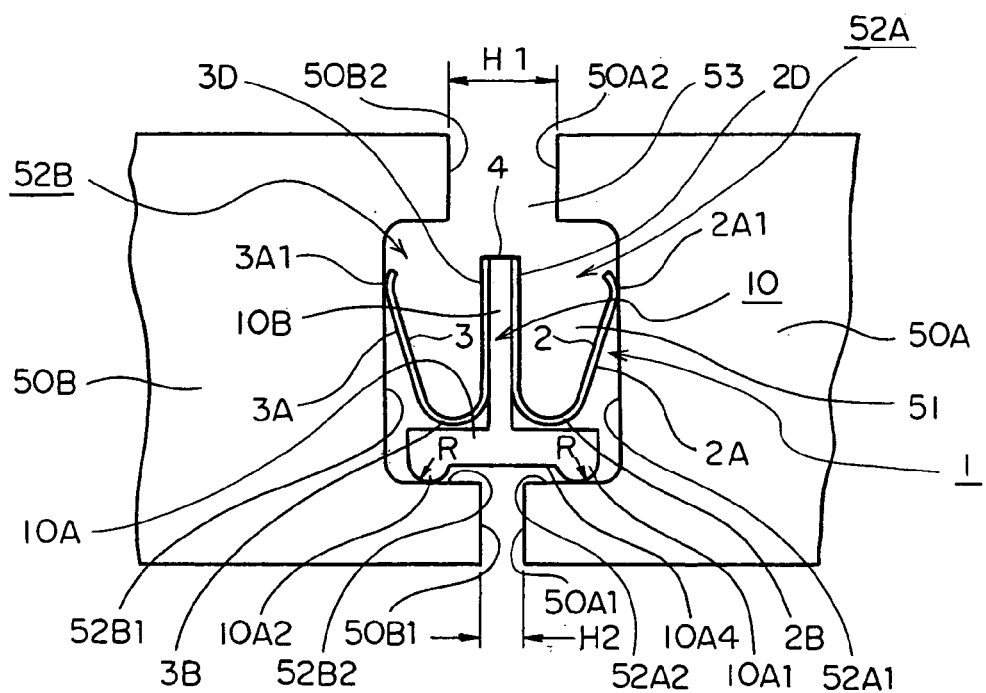
FIG. 1 is a front view of both mounting step portions of turbine platforms which mounts a seal device therein according to a first embodiment of the present invention.
Figure 2:
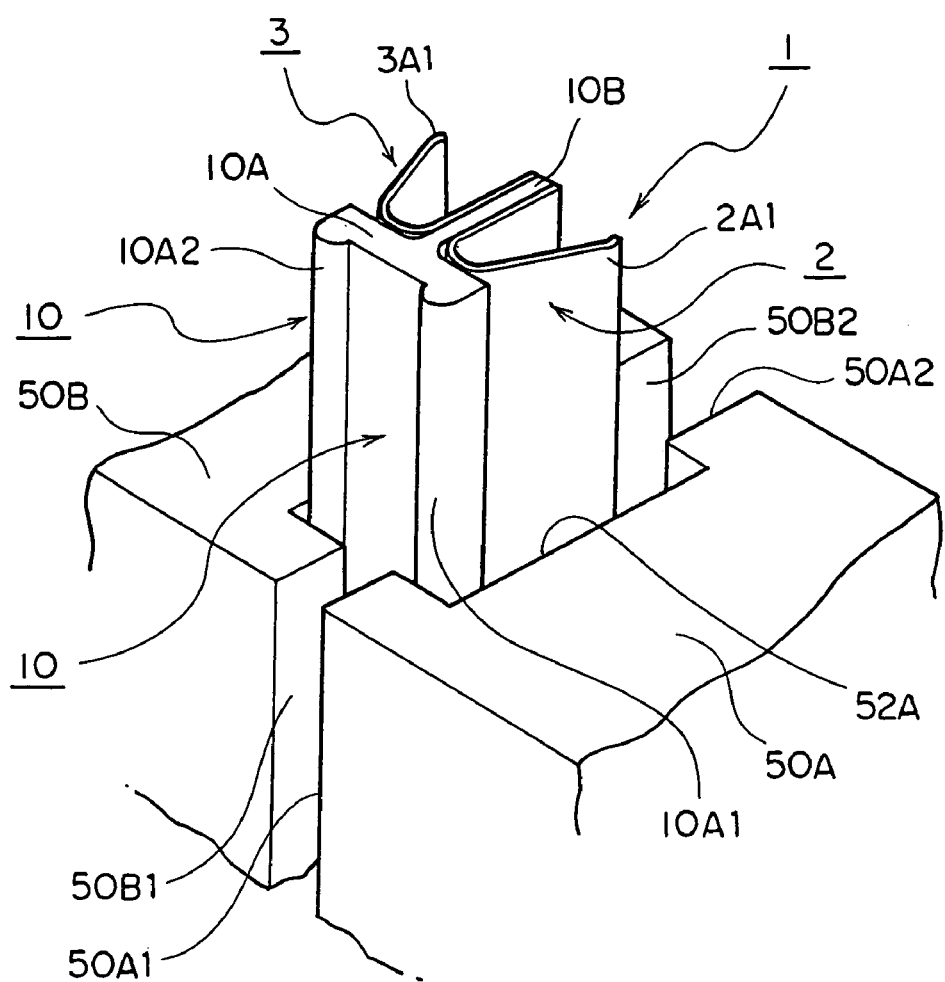
FIG. 2 is an oblique view of the seal device of FIG. 1 which is mounted in the both mounting step portions of turbine platforms.

FIGS. 1 and 2 show a seal device 1 of a preferred first embodiment related to the present invention. FIG. 1 shows the seal device 1 installed in a space portion 51 which is defined between a groove-shaped first step portion 52A and second step portion 52B. FIG. 2 shows the seal device 1 being inserted into the space portion 51. In FIGS. 1 and 2, the seal device 1 includes a "U"-sectioned first seal member 2 and a "U"-sectioned second seal member 3 which are symmetrically located on both sides of a retaining member 10B of a "T"-sectioned sealing main body 10 wherein the two seal members 2, 3 and the retaining member 10B are joined at a joining portion 4.

The first seal member 2 includes a bight-shaped first elastic portions 2B and a slant first side portion 2A and a second side portion 2D wherein the first side portion 2A and the second side portion 2D extend from the end portions of the first elastic portions 2B. The second seal members similarly includes a bight-shaped second elastic portions 3B and a slant first side portion 3A and a second side portion 3D wherein the first side portion 3A and the second side portion 3D extend from the end portions of the first elastic portions 3B. Thickness of the first seal member 2 and second seal member 3 is preferably in a range of from 0.1 mm to 0.2 mm. For this reason, the sealing main body 10 is made thicker than the first seal member 2 and second seal member 3 such that the first seal member 2 and second seal member 3 can be retained in a stable manner. Accordingly, thickness of the first seal member 2 and second seal member 3 can be made arbitrarily small such that the first seal member 2 having a first seal surface 2A1 and the second seal member 3 having a second seal surface 3A1 allow a wide range of displacement because of their large elastic deformation. A support portion 10A should be made larger in thickness than the retaining member 10B.

The bar-shape support portion 10A and the retaining member 10B define the sealing main body 10 which retains the first seal member 2 and the second seal member 3. The supporting member 10A disposes a first seal protrusion 10A1 and a second seal protrusion 10A2 on both end sections of a bottom surface 10A4. Radius R defines the radius of the circular arc cross-section of the first seal protrusion 10A1 and the second seal protrusion 10A2. If it is assumed, for example, that thermal expansion affecting a second slot surface 52A2 and a second symmetric slot surface 52B2 causes a positional offset in the perpendicular direction between the second slot surface 52A2 and the second symmetric slot surface 52B2, which results in the inclination of the supporting member 10A, the second slot surface 52A2 and the second symmetric slot surface 52B2 are still capable of maintaining pointwise sealing contact on their circular arc surfaces, respectively.

Thick wall nature of the first seal protrusion 10A1 and the second seal protrusion 10A2 at the end sections of the support portion 10A leads to a relatively thin wall characteristic of a middle portion between the first seal protrusion 10A1 and the second seal protrusion 10A2. This may cause arcuate elastic deformation of the middle portion by a small amount. The retaining member 10B is disposed directly atop the support portion 10A. As an alternative exemplary embodiment, the first seal protrusion 10A1 and the second seal protrusion 10A2 can be disposed at both longitudinally distal end sections. In this case, the first seal protrusion 10AL comes into contact with a first slot surface 52A1 while the second seal protrusion 10A2 comes into contact with a first symmetric slot surface 52B1. Accordingly, the first seal protrusion 10A1 and the second seal protrusion 10A2 effect a seal against the fluid leaking toward the direction of a small gap "H2".

A second side portion 2D of the first seal member 2 and a second side portion 3D of the second seal member 3 are arranged in a symmetric manner with respect to the side walls of the retaining member 10B and welded at their end portions defining a joint portion 4. The first elastic portion 2B and the second elastic portion 3B are arranged not to come in contact with the upper surface of the supporting member 10A, thereby leaving a clearance gap therebetween. Welding at the joint portion 4 can be substituted by a thread connection (not shown) wherein a bolt extends in a through hole from the side wall at a distal end. Alternatively, a clamping element (not shown) with a "U"-shaped cross-section can be used to provide a clamp joint wherein the second side portion 2D, the second side portion 3D and the retaining member 10B are inserted into the groove of the clamping element before fixating the second side portion 2D and the second side portion 3D by applying a compressive force wherein the retaining member 10B is sandwiched by the second side portions 2D, 3D. Yet alternatively, the end portion of the second side portion 3D can be extended longer than the end portion of the second side portion 2D and be inflected to a "U"-shape over the end portion of the second side portion 2D, followed by clamping the both end portions. Therefore, the end portions of the second side portion 2D and the second side portion 3D can be joined by several different means.

A first seal surface 2A1 is defined on the outer side surface of the first seal side portion 2A of the first seal member 2. Similarly, a second seal surface 3A1 is defined on the outer side surface of the first side portion 3A of the second seal member 3. Longitudinal length of the first side portion 2A and the first side portion 3A is preferably the same as that of the second side portion 2D and the second side portion 3D. The first seal side portion 2A and the first seal side portion 3A, if necessary, can be extended illustrated upward relative to the second side portion 2D and the second side portion 3D. In this configuration, the side surface of the second side portion 2D toward the first elastic portion 2B comes to mere contact with one side surface of the retaining member 10B while the side surface of the second side portion 3D toward the second elastic portion 3B comes to mere contact with the other side surface of the retaining member 10B. Therefore, when the seal device 1 is mounted in a space 51, and the first seal surface 2A1 of the first side portion 2A and the second seal surface 3A1 of the first side portion 3A perform elastic deformation with respect to the joint portion 4 as a fulcrum and sealing contact with the first slot surface 52A1 as well as with the first symmetric slot surface 52B1 is always maintained. Elastic deformation occurs to the second side portion 2D and the second side portion 3D which are connected through the joint portion 4 such that the side surface of the second side portion 2D located in the retaining member 10B side and the side surface of the second side portion 3D located in the retaining member 10B side are mutually separated from the side surfaces of the retaining member 10B. The sealing main body 10 and the respective first seal member 2 and second seal member 3 of this seal device 1 are made of a nickel-based alloy. Example of such a material is 76% Ni-16% Cr-8% Fe, i.e., INCONEL. INCONEL has high ductility and can be processed by hot/cold forming. It also has an outstanding corrosion resistance.

The seal device 1 is installed in the space 51 which is formed between the first slot portion 52A and the second slot portion 52B as shown in FIG. 2. The first slot portion 52A and the second slot portion 52B are provided for division end surfaces of gas turbine engines, nuclear related devices or the like which are subject to high pressure and high temperature fluids. Division end surfaces of one mating component 50A define a first end surface 50A1 and a second end surface 50A2. Division end surfaces of the other mating component 50B which are arranged opposite to the end surfaces of the one component 50A define a first symmetric end surface 50B1 and a second symmetric end surface 50B2. And the first end surface 50A1 and the first symmetric end surface 50B1 define a small gap H2 therebetween for the reason of absorbing thermal expansion. Also the second end surface 50A2 and the second symmetric end surface 50B2 define a large gap H1 therebetween which is arranged larger than the small gap H2 for the reason of absorbing larger thermal expansion due to a direct exposure to hot gases. There are some cases where the large gap H1 and the small gap H2 are arranged to have an identical dimension.

Yet there are some other cases where the first slot portion 52A and the second slot portion 52B are shaped to an "L"-section. The large gap H1 and the small gap H2, as stated above, can be designed from necessity to a variety of dimensions. A slot-shaped first slot portion 52A is formed between the first end surface 50A1 and the second end surface 50A2. The first slot portion 52A includes the first slot surface 52A1 and the second slot surface 52A2. Likewise, a second slot portion 52B is formed between the first symmetric end surface 50B1 and the second symmetric end surface 50B2. The second slot portion 52B includes the first symmetric slot surface 52B1 and the second symmetric slot surface 52B2. The seal device 1 is mounted in the space portion 51 as illustrated in FIG. 1. In this configuration, the first sealing protrusion 10A1 of the supporting member 10A comes into contact with the second slot surface 52A2. Also the second sealing protrusion 10A2 comes into contact with the second symmetric slot surface 52B2. The first seal surface 2A1 is brought into sealing contact with the first slot surface 52A1 while the second seal surface 3A1 is brought into sealing contact with the first symmetric slot surface 52B1.

Figure 3:
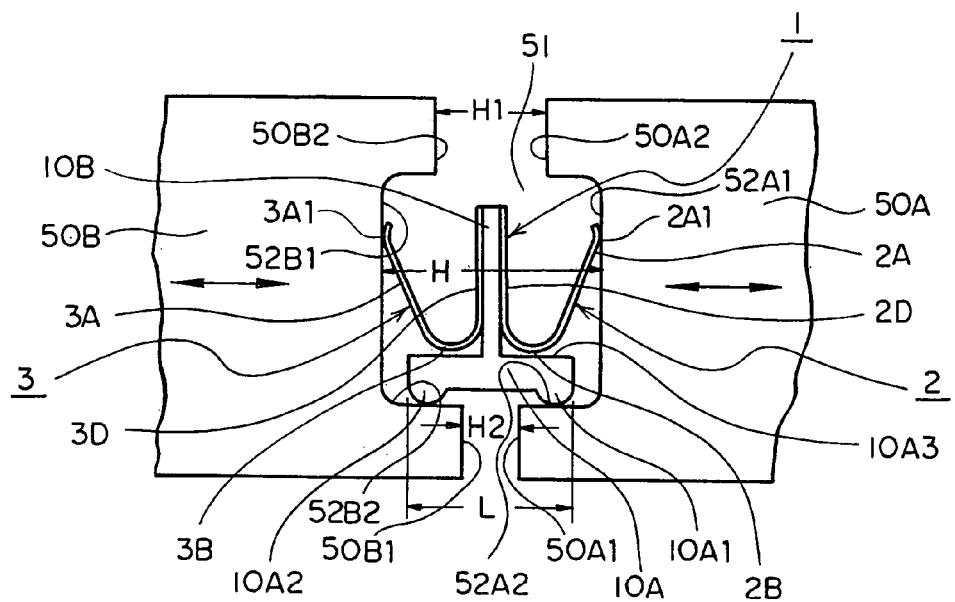
FIG. 3 is a front view of the seal device of FIG. 1 installed under the maximum opening gap between the mounting step portions.
Figure 4:
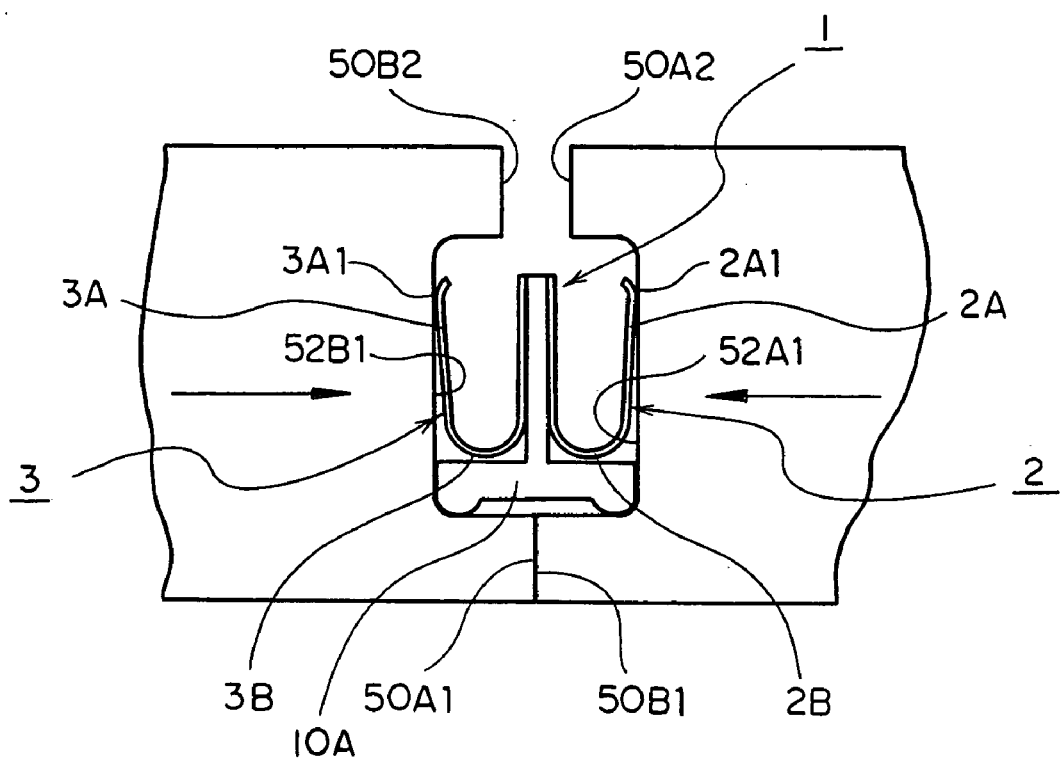
FIG. 4 is a front view of the seal device of FIG. 1 installed under the minimum opening gap between the mounting step portions.
Figure 5:
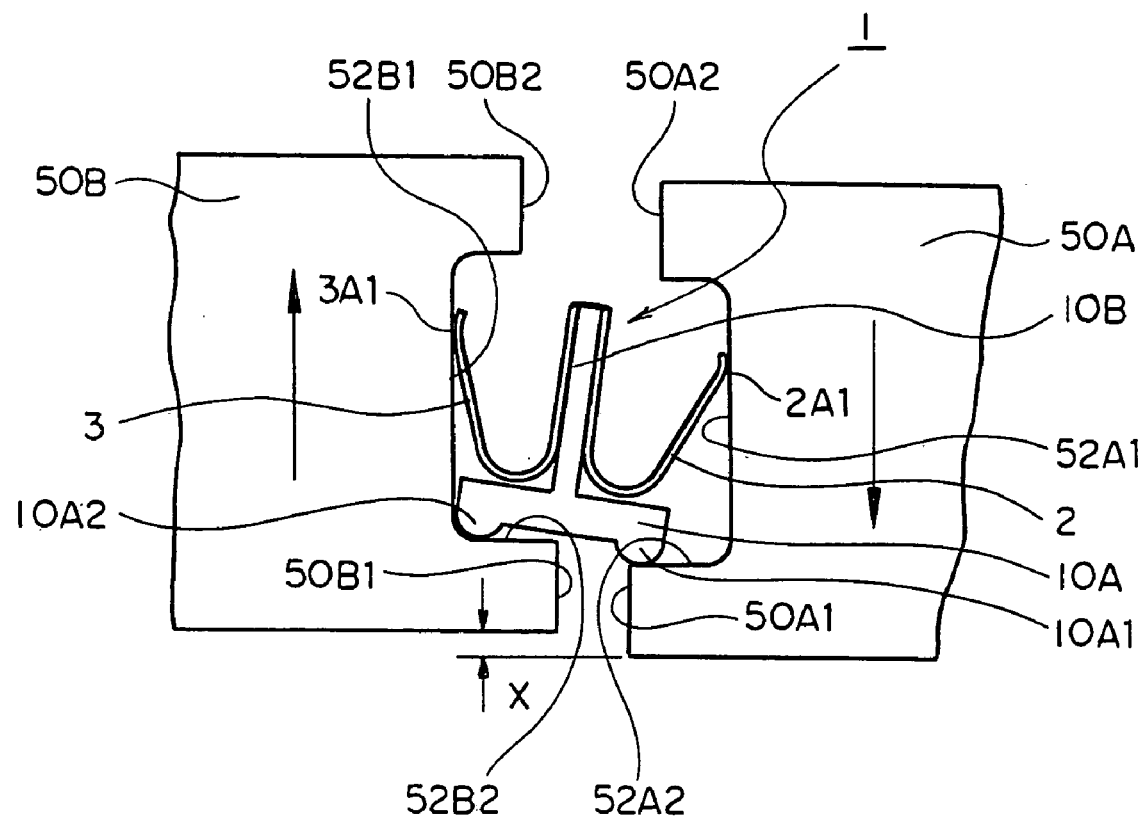
FIG. 5 is a front view of the seal device of FIG. 1 installed under the presence of a vertical relative displacement between the two mounting step portions.

FIGS. 3, 4 and 5 illustrate the seal device 1 of FIG. 1 after being mounted in place. FIG. 3 represents a case in which the small gap H2 between the first end surface 50A and the first symmetric end surface 50B1 becomes maximal. That is, FIG. 3 corresponds to a gap H across the space portion 51 of the seal device 1 being greatest in which the first seal surface 2A1 is brought into sealing contact with the first slot surface 52A1 while the second seal surface 3A1 is brought into sealing contact with the first symmetric slot surface 52B1. This simultaneously realizes sealing contact of the first sealing protrusion 10A1 against the second slot surface 52A2 as well as sealing contact of the second sealing protrusion 10A2 against the second symmetric slot surface 52B2. Furthermore, the first sealing protrusion 10A1 forms contact with the second slot surface 52A2 on the circular arc of the first sealing protrusion 10A1 while the second sealing protrusion 10A2 forms contact with the second symmetric slot surface 52B2 on the circular arc of the second sealing protrusion 10A2. Therefore, even with a tilt of the supporting member 10A, a two-point contact condition is maintained thereat such that the first seal surface 2A1 and the second seal surface 3A1, respectively, are securely brought into sealing contact with the first slot surface 52A1 and the first symmetric slot surface 52B1.

FIG. 4 shows a case in which the small gap H2 between the first end surface 50A and the first symmetric end surface 50B1 becomes minimal. That is, this corresponds to a state where the first seal surface 2A1 and the second seal surface 3A1 are compressed to the greatest extent by the first seal surface 2A1 and the second seal surface 3A1 being brought into close contact with the first slot surface 52A1 and the first symmetric slot surface 52B1, respectively. Under this circumstance, the both end sections of the supporting member 10A necessarily come into contact with the first slot surface 52A1 and the first symmetric slot surface 52B1 such that the first seal member 2 and the second seal member 3 never exceed the allowable design range of compression.

FIG. 5 shows another case in which a vertical offset is induced between the first slot portion 52A and the second slot portion 52B by thermal expansion of the one component 50A and the other component 50B. Even under such a circumstance, the circular-arc surfaces of the first seal protrusion 10A1 and the second seal protrusion 10A2 formed on the supporting member 10A allow the first seal protrusion 10A1 and the second seal protrusion 10A2 to maintain contact with the second slot surface 52A2 and the second symmetric slot surface 52B2, respectively, while being at an angle to the second slot surface 52A2 and the second symmetric slot surface 52B2. This simultaneously enables the first seal surface 2A1 to come into sealing contact with the first slot surface 52A1 and also the second seal surface 3A1 to come into sealing contact with the second symmetric slot surface 52B1.

Figure 6:
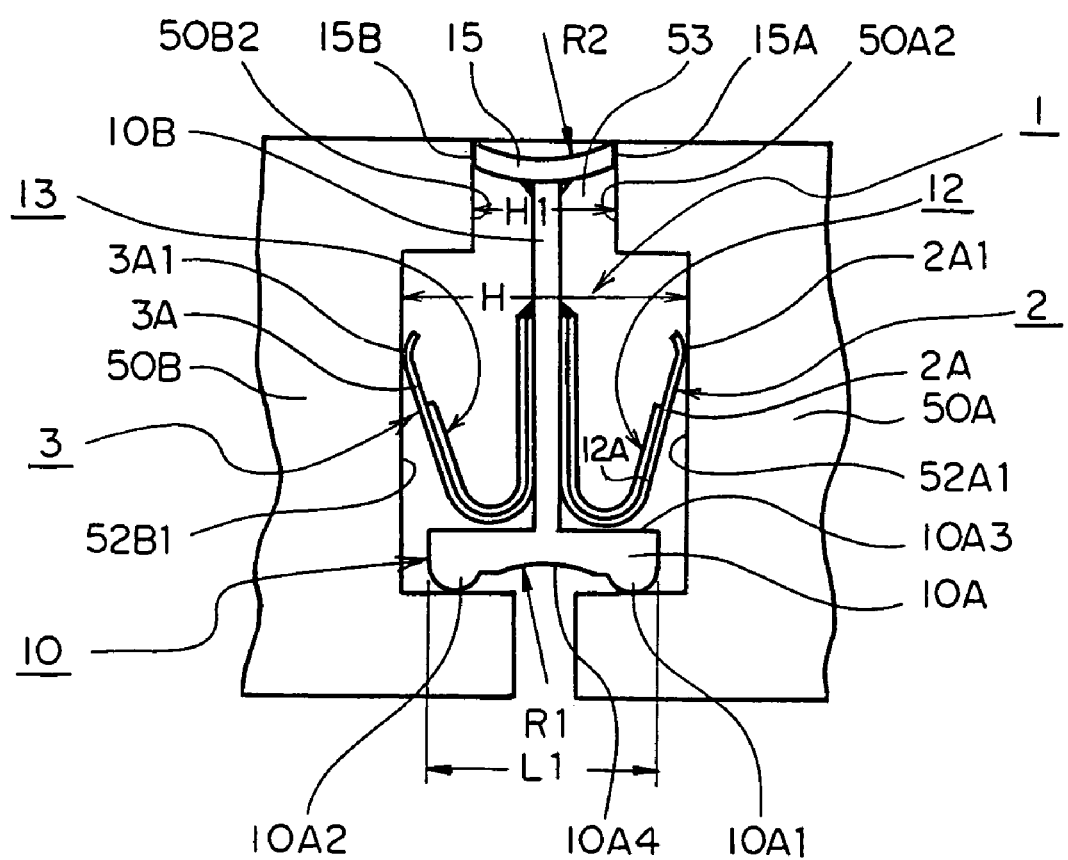
FIG. 6 is a front view of both mounting step portions of turbine platforms which mounts a seal device therein according to a second embodiment of the present invention.

FIG. 6 shows a seal device 1 as a second embodiment related to the present invention. Overall shape of the seal device 1 in FIG. 6 is similar to that in FIG. 1. What makes it different from the seal device 1 in FIG. 1 is that a retaining portion 10B thereof is arranged longer than the retaining portion 10B shown in FIG. 1, and also that a seal cover 15 is disposed at the end section of the illustrated upper portion. The seal cover 15 is made from a heat resistive plate being bent to an arcuate shape across the large gap "H1" and is fixedly welded to the end section of the retaining portion 10B. Width dimension of the seal cover 15 is arranged approximately equal to the maximum width of the large gap "H1" between the second end surface 50A2 and the second symmetric end surface 50B2. A first seal end portion 15A opposes to and comes into close contact with the second end surface 50A2 while a second seal end portion 15B of the seal cover 15 opposes to and comes into close contact with the second symmetric end surface 50B2.

If the large gap H1 between the second end surface 50A2 and the second end surface 50B2 is narrowed after the thermal expansion of the one component 50A and the other component 50B, the arcuate seal cover 15 with radius R2 performs elastic deformation, decreasing the radius R2 in order to span across the large gap H1. For this reason, the seal cover 15 prevents high temperature gases from flowing into the direction of the first seal member 2 and the second seal member 3. The first seal member 2 and the second seal member 3 have a two-ply construction being made from a heat resistive sheet material. This two-ply configuration for the first seal member 2 and the second seal member 3 is preferably arranged to have a tip end of an inner circumferential third seal member 12 located toward the first seal surface 2A1 shorter than the length of the first side portion 2A of the first seal member 2 as shown in FIG. 6. A fourth seal member 13 should also be arranged in the same and symmetric form as the third seal member 12 as shown in FIG. 6. Further, the supporting member 10A has a concave bottom surface 10A4 whose radius is R4. The concave bottom surface 10A4 is intended for absorbing machining errors by bending arcuately when the supporting member 10A is urged sideways from the both end sections. That is, it is for dealing with such a case that the one component 10A and the other component 10B exert urging forces to the supporting member 10A whose width L1 is slightly longer than the open gap H and the concave bottom surface 10A4 automatically adjusts its radius according to the gap H. Explanation to other portions is omitted and it is assumed that same reference numerals to FIG. 1 imply same configurations thereto. The seal device 1 also is made of a heat resistive material. Example of such a material is 76% Ni-16% Cr-8% Fe, i.e., INCONEL.

Figure 7:
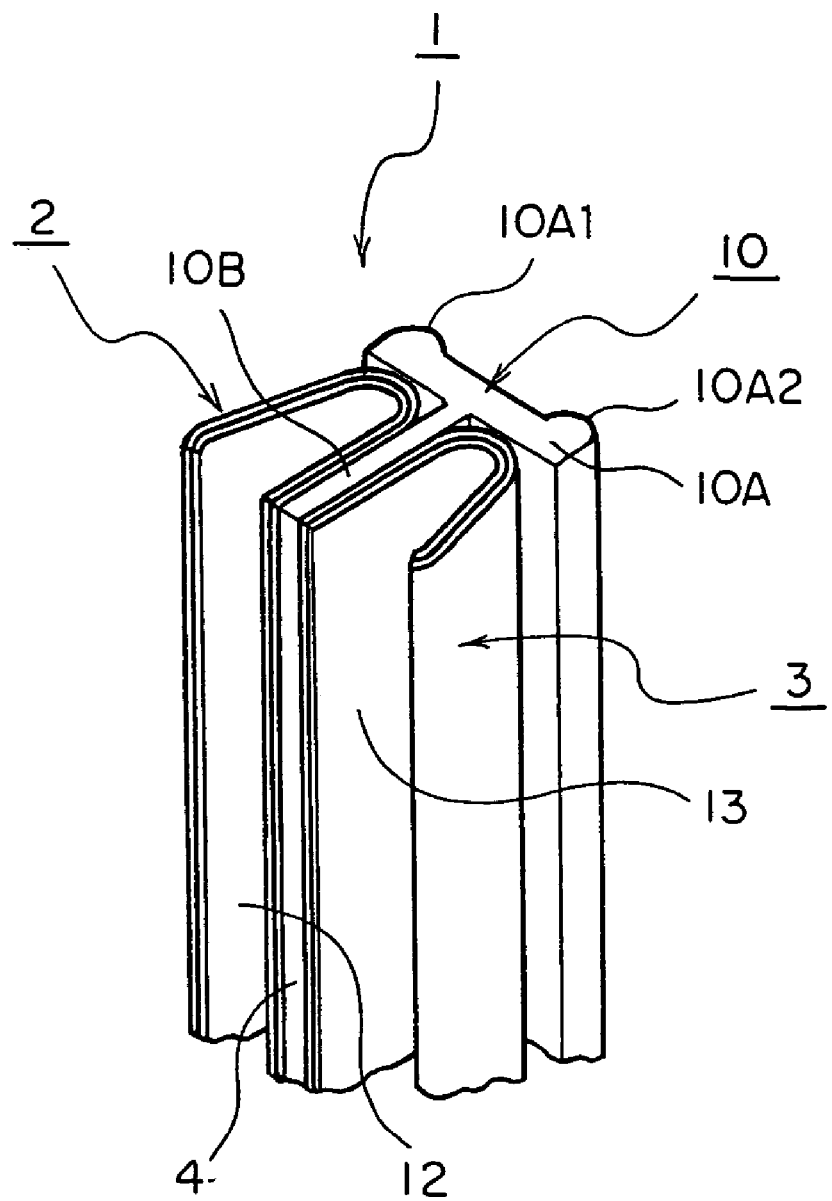
FIG. 7 is an oblique view of a seal device according to a third embodiment of the present invention.

FIG. 7 shows a seal device 1 as a third embodiment related to the present invention. The seal device 1 in FIG. 7 is similar to the seal device 1 in FIG. 1, but a first seal member 2 and a second seal member 3 have a two-ply construction being made from a heat resistive sheet material. That is, a third seal member 12 and a fourth seal member 13 are laminated to the inner circumferential surfaces of the first seal member 2 and the second seal member 3, respectively. Length of the first side portions of the third seal member 12 and the fourth seal member 13 is arranged approximately the same as that of respective side portions 2A, 3A of the first seal member 2 and the second seal member 3. However, the first side portion of the third seal member 12 and the first side portion of the fourth seal member 13 can be designed shorter if necessary. Explanation to other portions is omitted and it is assumed that same reference numerals to FIG. 1 imply same configurations thereto.

Figure 8:
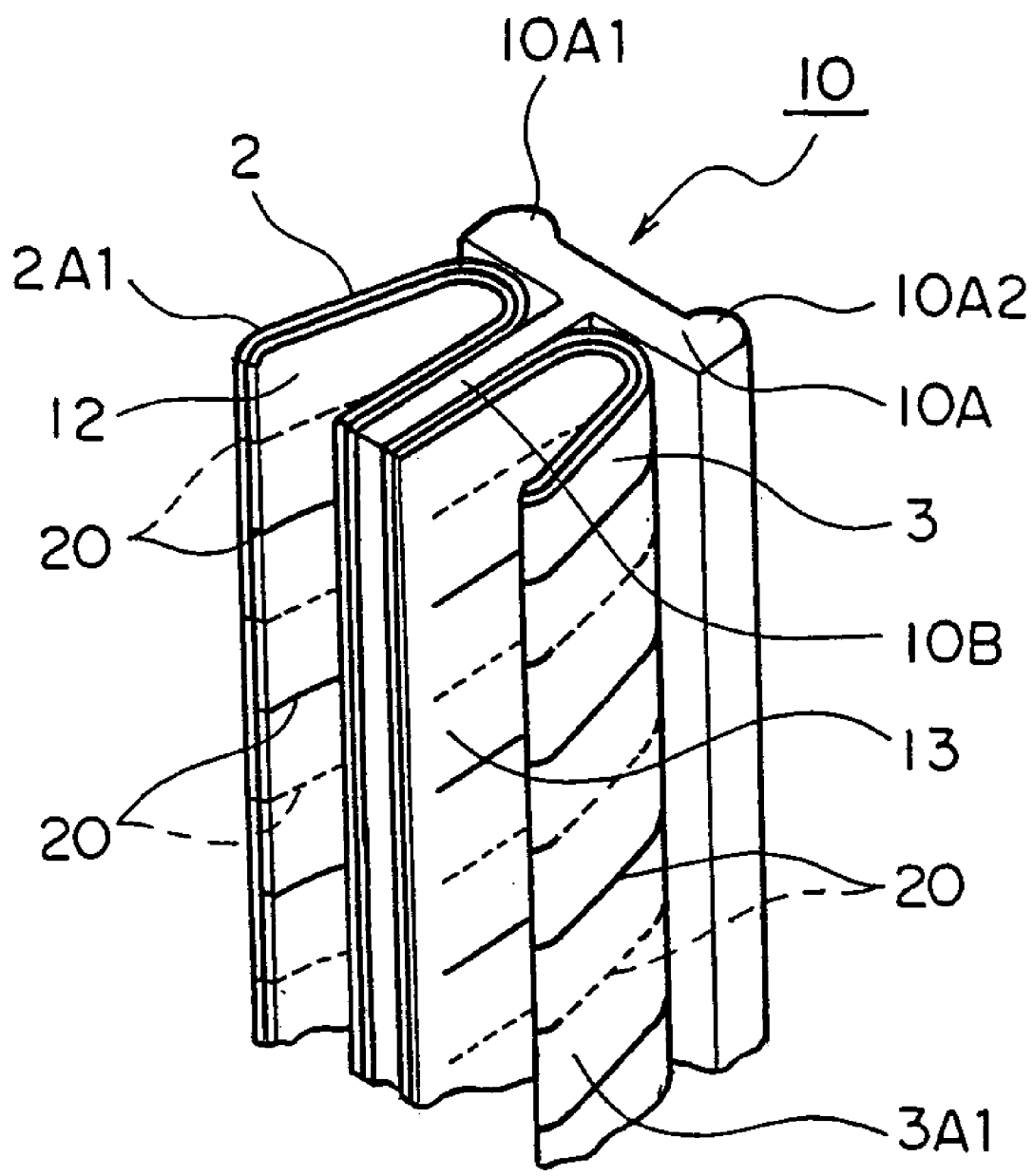
FIG. 8 is an oblique view of a seal device according to a fourth embodiment of the present invention.

FIG. 8 shows a seal device 1 as a fourth embodiment related to the present invention. Overall shape of the seal device 1 in FIG. 8 is similar to the seal device 1 in FIG. 7. As illustrated in FIG. 8, the difference is in that the first seal member 2, the second seal member 3, the third seal member 12 and the fourth seal member 13 retain slits 20 wherein a plurality of slits 20 are disposed in an equally spaced manner along the longitudinal direction in the respective elastic portions 2B, 3B as well as toward the elastic portion 2B, 3B side of the respective first side portions 2A, 3A and of the second side portions 2D, 3D. The slits 20 formed in the first seal member 2 and the second seal member 3 and the slits 20 formed in the third seal member 12 and the fourth seal member 13 are alternately aligned along the longitudinal direction in order to block the passage of the fluids through the slots 20. The slit 20 disposed in the seal device 1 is intended for reducing the rigidity of the two-ply configuration of the first seal member 2 and the third seal member 12 and also of the second seal member 3 and the fourth seal member 13 and enlarging displacement of the first seal surface 2A1 and the second seal surface 3A1. Explanation to other portions is omitted and it is assumed that same reference numerals to FIG. 1 imply same configurations thereto.

Figure 9:
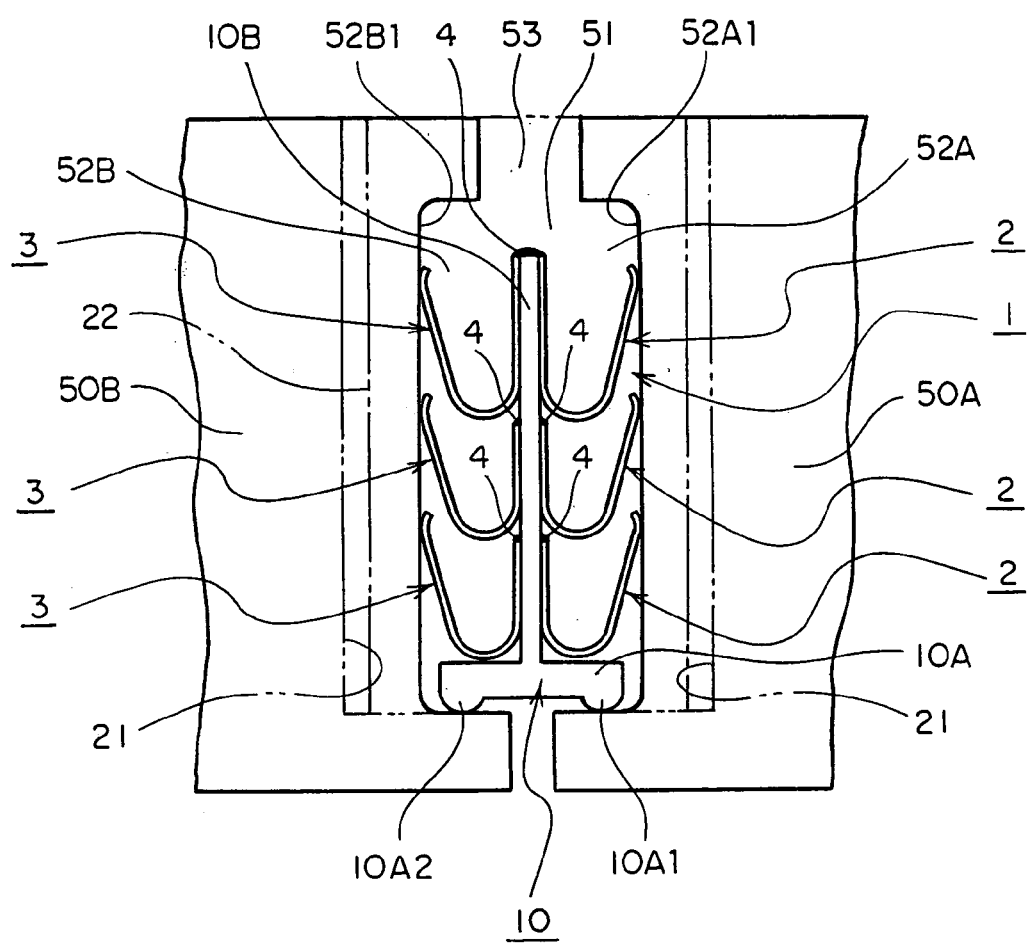
FIG. 9 is a front view of both mounting step portions of turbine platforms which mounts a seal device therein according to a fifth embodiment of the present invention.

FIG. 9 shows a seal device 1 as a fifth embodiment related to the present invention. In the seal device 1 of FIG. 9, the retaining member 10B is prolonged relative to that in FIG. 1, and three sets of the first seal member 2 and the second seal member 3 are arranged in a row along the side wall of the retaining member 10B. Although this example uses three sets, either two or four sets can be used instead depending on the design consideration in terms of the seal ability. As illustrated by virtual broken lines in FIG. 9, hollow sections 21 are provided at the both end sections of the one component 50A and the other component 50B along the direction of the mounting slot. Covers 22 are placed in the both hollow sections 21 in order to prevent the sealed fluid from leaking therefrom after being guided by the individual seal members 2, 3, 12, 13. The covers 22 may not be necessary if the both end sections of the respective components 50A, 50B are covered with some other components. Alternatively, the first slot portion 52A and the second slot portion 52B can be arranged to have a hollow structure with both their longitudinal ends sealed. With the first slot portion 52A and the second slot portion 52B thus arranged, the cover 22 is no more necessary. Explanation to other portions is omitted and it is assumed that same reference numerals to FIG. 1 imply same configurations thereto.

Figure 10:
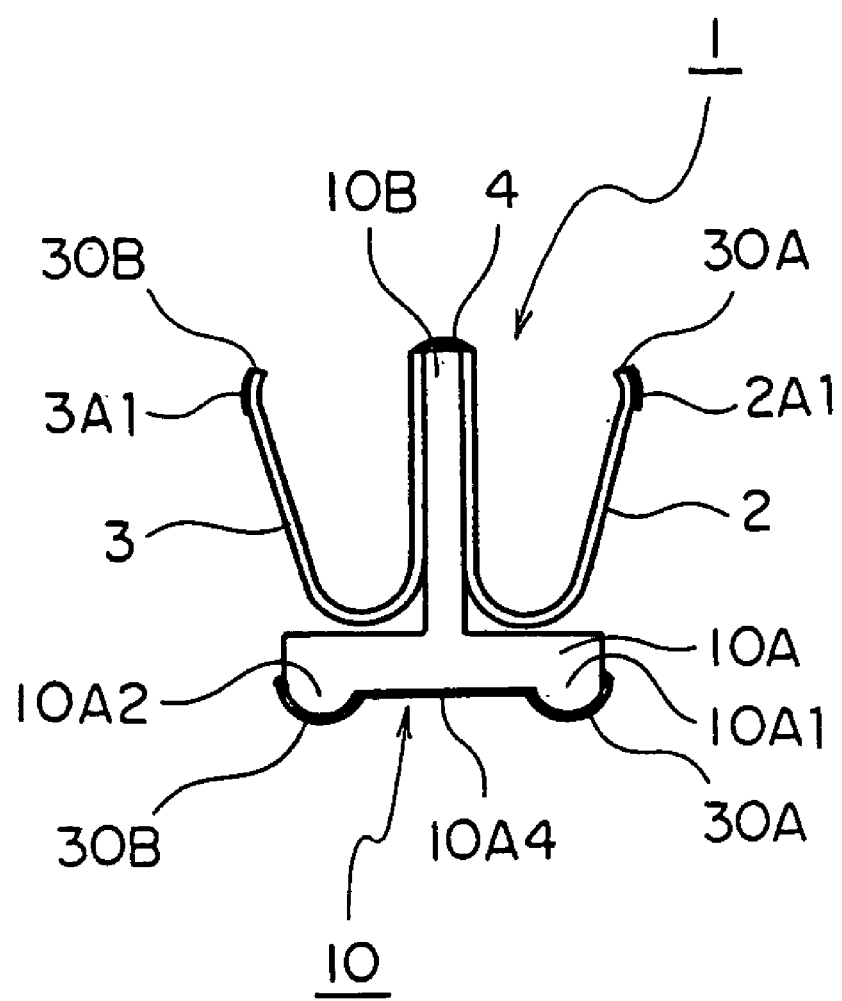
FIG. 10 is a front view of a seal device according to a sixth embodiment of the present invention.

FIG. 10 shows a seal device 1 as a sixth embodiment related to the present invention. Difference from the seal device 1 in FIG. 1 is that first sheet 30A is adhered onto the first seal surface 2A1 and the first seal protrusion 10A1. Likewise, second sheet 30B is adhered to the second seal surface 3A1 and the circumference of the second seal protrusion 10A2. The sheets 30A, 30B are made of a low friction material such as fluoric-resin or the like. This is for reducing friction at the first seal surface 2A1, the second seal surface 3A1, the first seal protrusion 10A1 and the second seal protrusion 10A2. Explanation to other portions is omitted and it is assumed that same reference numerals to FIG. 1 imply same configurations thereto.

Figure 11:
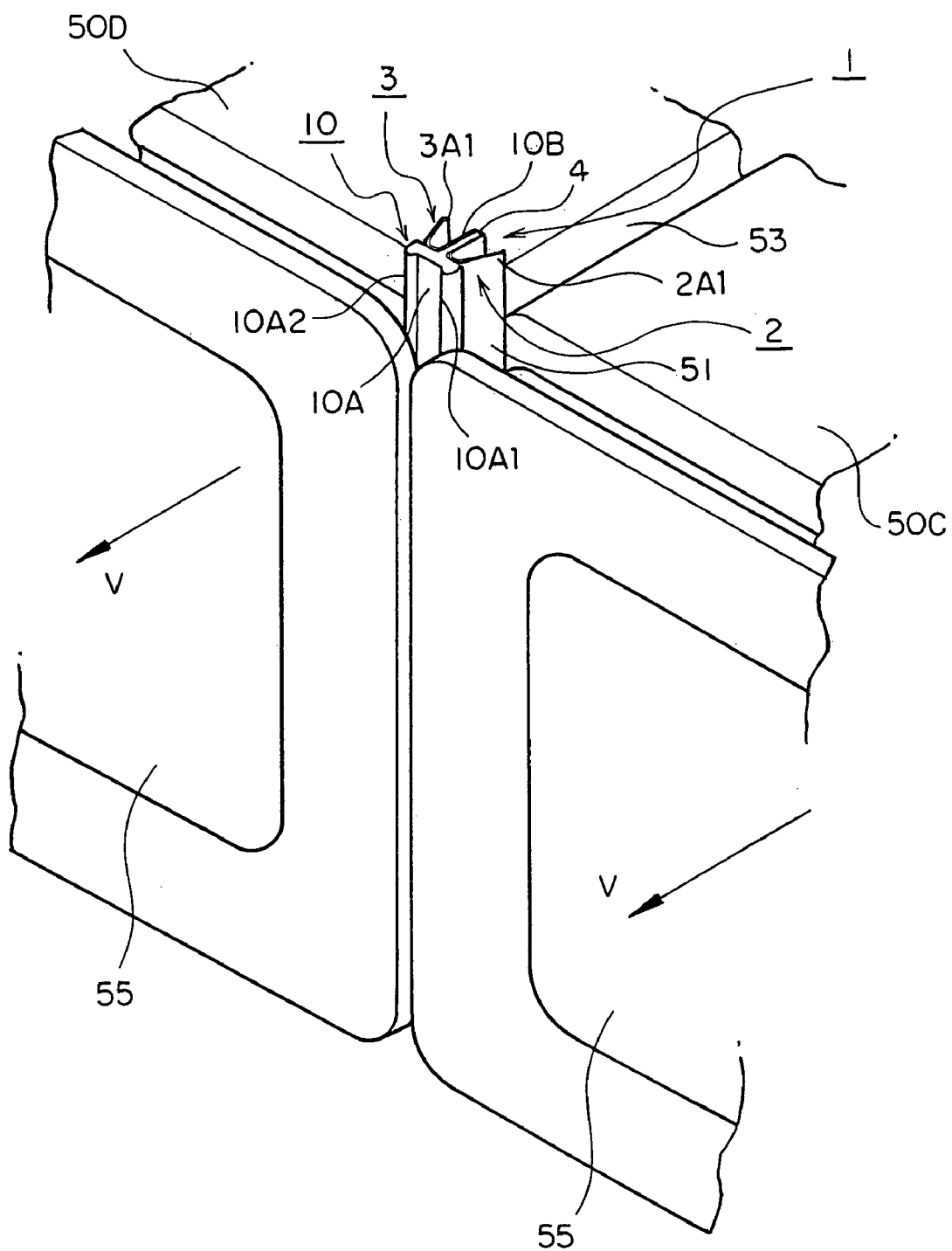
FIG. 11 is an oblique view of a seal device according to the present invention which is mounted between the mounting step portions of gas or steam turbine assembly.
Figure 12:
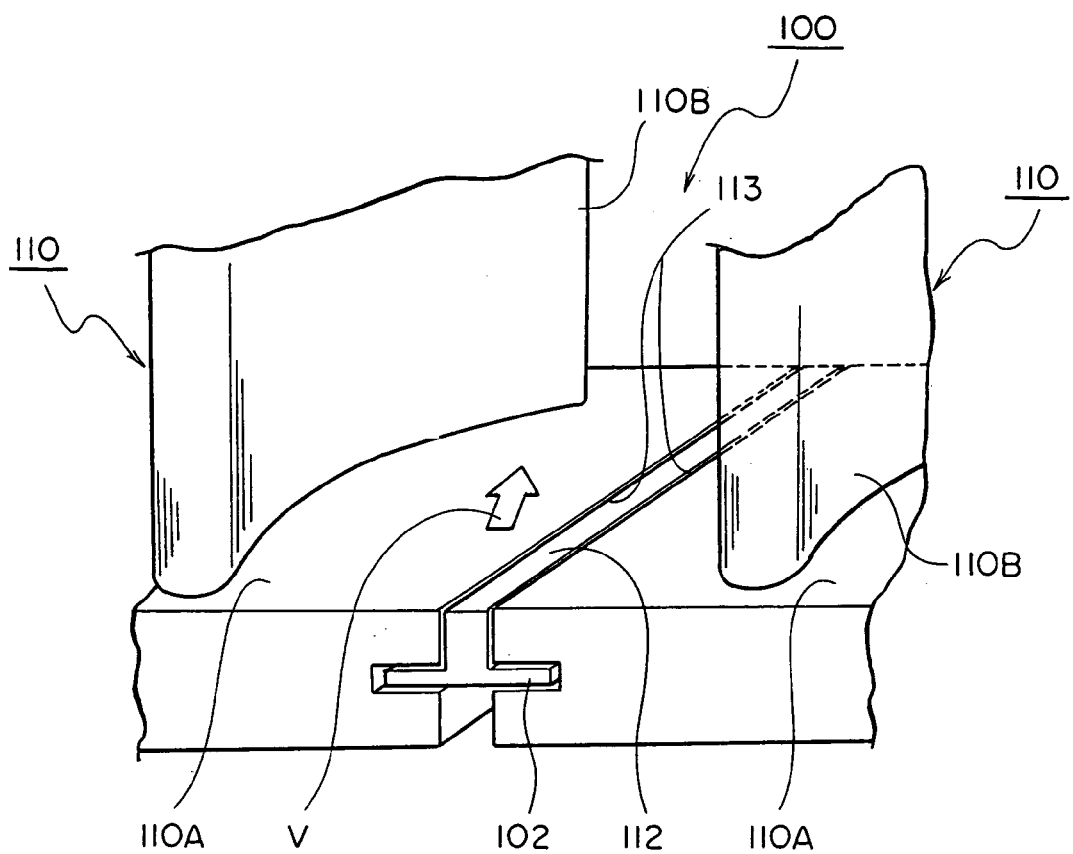
FIG. 12 is an oblique view of a seal device according to the prior art related to the present invention which is mounted between the mounting step portions of gas turbine platforms.

FIG. 11 shows an example of alternative applications of mounting the seal device 1. Illustrated in FIG. 11 is a transition piece which is located downstream of a combustor of gas turbine. Square fluid passage duct 50C, 50D for hot gases retain a square passage 55, 55 therewithin in order to provide a seal between the joint surfaces. Connecting the adjacent side surfaces of the individual square fluid passage ducts 50C, 50D for hot gases leads to an annular form as a whole. The square fluid passage ducts 50C, 50D will expand due to high temperature of the sealed fluid which flows through the passages inside the square fluid passage ducts 50C, 50D to the direction of "V". In order to prevent the thermal expansion of the square fluid passage ducts 50C, 50D, cooling air supplied from a passage (not shown) is arranged to flow through between the joint surfaces of the square fluid passage ducts 50C, 50D to the direction of "V". The temperature of the cooling air rises to 200° C. through 500° C. while interacting with the hot gases which exceeds 1000° C. The cooling air, however, will cause a reduction of thermal efficiency of gas turbine when the cooling air sneaks into the hot gases from the end sections of the square fluid passage ducts 50C, 50D. For this reason, the seal device 1 is installed in the space portion 51 in order to prevent the cooling air from leaking from the clearance formed between the joint surfaces of the square fluid passage ducts 50C, 50D and mixing with the hot gases flowing in the direction of "V".

FIG. 11 illustrates how the seal device 1 is mounted in the space portion 51 formed between the joint surfaces. Illustrated uppermost and lowermost portions of the square fluid passage ducts 50C, 50D in FIG. 11 are sealed by other components attached to the ducts, thereby preventing the sealed fluid from leaking toward the upward or downward direction. Similarly to FIG. 1, the respective first seal surface 2A1, the second seal surface 3A1, the first seal protrusion 10A1 and the second seal protrusion 10A2 of the seal device 1 are brought into sealing contact with the both first slot portion 52A and second slot portion 52B of the square fluid passage ducts 50C, 50D. Explanation to other portions of FIG. 11 is omitted and it is assumed that same reference numerals to FIG. 1 imply same configurations thereto.

When the opening gap "H" between the first slot surface 52A1 and the second slot surface 52B1 of the respective first slot portion 52A and the second slot portion 52B is narrowed, elastic deformation occurs to the first side portion 2A located to the one side of the joint portion 4 and another first side portion 3A located to the opposite side of the joint portion 4 with respect to the joint portion 4 as a fulcrum. In this case, the side surface of the second side portion 2D located in the retaining member 10B side and the side surface of the second side portion 3D located in the retaining member 10B side are mutually separated from the side surfaces of the retaining member 10B. For this reason, the first seal surface 2A1 and the second seal surface 3A1 are able to tolerate large displacement while providing sealing contact by more or less a uniform surface pressure against the first slot surface 52A1 of the first slot portion 52A and the second slot surface 52B1 of the second slot portion 52B. As a result, the seal device is capable of exhibiting outstanding seal performance by keeping sealing contact regardless of the deformation of the first slot surface 52A1 of the first slot portion 52A and the deformation of the second slot surface 52B1 of the second slot portion 52B. Further, the compact configuration of the seal device 1 allows an easy installation in a small area across the mounting slot portions which is formed between the joint surfaces of the fluid passage ducts.

The seal device 1 which appears in the third embodiment through the sixth embodiment is made of the aforementioned heat resistive material such as nickel-based alloy. Example of such a material is 76% Ni-16% Cr-8% Fe, i.e., INCONEL. INCONEL particularly has high ductility and can be processed by hot/cold forming. It also has an outstanding corrosion resistance.

The seal device 1 of the present invention exhibits outstanding seal ability and durability by being mounted in the space section 51 formed across the mounting slot portions which is subjected to high temperature, high pressure fluids. Simple configuration of the seal device 1 provides an easy installation to a mounting slot portions even in a complex form, thereby reducing the installation cost of the seal device 1. Even if the first slot portion 52A and the second slot portion 52B only define the space portion 51 in a rough precision, a secure seal can be achieved by means of the seal device 1 including the elastically deformable seal members 2, 3 which are retained by the sealing main body 10 as reinforcement. Also the production cost of the seal device 1 can be reduced because of the simple structure of the seal device 1 wherein the first seal member 2 and the second seal member 3 are separately fabricated before being joined together.

Next, alternative embodiments relative to the present invention will be described below.

A seal device 1 of a second embodiment related to the present invention is arranged in such a way that the end section of the second side portion 2D of the first seal member 2 and the end section of the second side portion 3D of the second seal member 3 are welded to the end portion of the retaining member 10B.

In the seal device 1 related to the second embodiment of the present invention, since the end section of the second side portion 2D of the first seal member 2 and the end section of the second side portion 3D of the second seal member 3 are welded to the end portion of the retaining member 10B, the total length of the first seal member 2 and the second seal member 3 from the joint portion 4 to the first seal surface 2A1 and the second seal surface 3A1, respectively, can be prolonged in order to provide sufficient elastic deformation to the first side portion 2A and the first elastic portion 2B of the first seal member 2 as well as the first side portion 3A and the second elastic portion 3B of the second seal member 3. For this reason, the first seal surface 2A1 of the first seal member 2 and the second seal surface 3A1 of the second seal member 3 are capable of keeping up with large displacement in the first slot surface 52A1 and the first symmetric slot surface 52B1 against which sealing contact is fully maintained. Also the seal device 1 can continue to exhibit seal ability even under large displacement of the first seal surface 2A1 and the second seal surface 3A1.

A seal device 1 of a third embodiment related to the present invention is arranged in such a way that the first seal protrusion 10A1 and the second seal protrusion 10A2 have an arcuate cross-section.

In the seal device 1 related to the third embodiment of the present invention, since the supporting member 10A retains the first seal protrusion 10A1 and the second seal protrusion 10A2 on the both end sections of the bottom surface 10A4 wherein the first seal protrusion 10A1 and the second seal protrusion 10A2 have an arcuately protruding form and, respectively, come into contact with the second slot surface 52A2 and the second symmetric slot surface 52B2, even when a step-like difference occurs between the second slot surface 52A2 and the second symmetric slot surface 52B2, the arcuate first seal protrusion 10A1 and the second seal protrusion 10A2 enables the first seal surface 2A1 and the second seal surface 3A1 to be always brought into sealing contact with the first slot surface 52A1 and the first symmetric slot surface 52B1, respectively. Furthermore, the arcuate first seal protrusion 10A1 and the second seal protrusion 10A2 disposed on the bottom surface 10A4 of the supporting member 10A can always maintain contact at a certain portion of the arcuate surfaces even under the presence of a step difference between the first slot surface 52A1 and the first symmetric slot surface 52B1. Therefore, the first seal surface 2A1 disposed in the first side portion 2A and the second seal surface 3A1 disposed in the first side portion 3A wherein the first side portion 2A, 3A and supported by the retaining member 10B in an elastically deformable manner are capable of effecting a seal against the sealed fluid.

A seal device 1 of a fourth embodiment related to the present invention is arranged such that a plurality of the first seal members 2 and the second seal members 3 are aligned in parallel along the side wall of the retaining member 10B.

In the seal device 1 related to the fourth embodiment of the present invention, since a plurality of the first seal members 2 and the second seal members 3 are aligned in parallel along the side wall of the retaining member 10B, relative deformation between the respective mounting slot portions due to the thermal expansion of the one component 50A and the other component 50B can be tolerated by means of the multiple seal members 2, 3 disposed in parallel, thereby providing stable sealing contact at the respective first seal surface 2A1 and the second seal surface 3A1. Also the individual seal surfaces 2A1, 3A1 combined can provide a double or triple sealing effect in the direction of the fluid flow.

A seal device 1 of a fifth embodiment related to the present invention is arranged in such a manner that, when the first end surface 50A1 of the one component 50A is brought into contact with the first symmetric end surface 50B1, the respective end sections of the supporting member 10A also are more or less brought into contact with the first slot surface 52A1 of the one component 50A and the first symmetric slot surface 52B1 of the other component 50B.

In the seal device 1 related to the fifth embodiment of the present invention, since the respective end sections of the supporting member 10A are arranged to come into contact with the first slot surface 52A1 of the one component 50A and the first symmetric slot surface 52B1 of the other component 50B when the thermal expansion or the like of the one component 50A and the other component 50B causes the first end surface 50A1 and the first symmetric end surface 50B1 of the both components 50A, 50B to come into contact with one another, this is capable of preventing excessive deformation from occurring to the first seal surface 2A1 and the second seal surface 3A1. Also if severe deformation causes the first seal surface 2A1 and the second seal surface 3A1 to exceed their own seal capability and the overall seal ability of the seal device 1 is reduced, the first seal protrusion 10A1 and the second seal protrusion 10A2 are still able to provide a seal.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

As described above, the seal device of the present invention can effectively be used at connections of generic machines which require sealing against a hot and high pressure fluid. In particular, a seal device of this kind is effective for the use of the mounting slots of gas turbine engines, nuclear devices or the like which are subject to deformation or vibration due to thermal stresses caused by the hot and high pressure fluid. Also its high versatility to any kind of space formed at the mounting slot as well as its low production cost brings additional advantages to this seal device.

What is claimed is:

1. A seal device for effecting a seal at a connection space defined between an end surface of one component and an end surface of other component, said seal device comprising:
   a) a supporting member having a first seal protrusion and a second seal protrusion, said first seal protrusion being brought into sealing contact with a second slot surface of said one component, said second seal protrusion being brought into sealing contact with a second symmetric slot surface of said other component;
   b) a retaining member protruding from said supporting member;
   c) a first seal member including a second side portion, a bight-shaped first elastic portion and a first side portion, said second side portion being fixed to a side wall of said retaining member, said first side portion being at an angle relative to a first slot surface of said one component, said first seal member beinQ formed from an alloy and having a sheet form;
   d) a second seal member including a second side portion, a bight-shaped first elastic portion and a first side portion, said second side portion being fixed to an other side wall of said retaining member, said first side portion being at an angle relative to a first symmetric slot surface of said other component said second seal member being formed from an alloy and having a sheet form, said second seal member being arranged symmetrically to said first seal member;
   e) a first seal surface being defined at a distal end portion of the outer side surface of said first side portion, said first seal surface being brought into sealing contact with the first slot surface of said one component; and
   f) a second seal surface being defined at a distal end portion of the outer side surface of said first side portion, said first seal surface being brought into sealing contact with the first symmetric slot surface of said other component;
   wherein the end sections of both said second side portions are fixed to said retaining member.

2. A seal device as claimed in claim 1, wherein said second side portion of said first seal member and said second side portion of said second seal member are welded to the side walls of said retaining portion.

3. A seal device as claimed in claim 1, wherein said first seal protrusion and said second seal protrusion have a circular-arc cross-section.

4. A seal device as claimed in claim 1, wherein a plurality of said first seal members and said second seal members are disposed in parallel along the side walls of said retaining member.

5. A seal device as claimed in claim 1 wherein, when a first end surface of said one component is brought into contact with a first symmetric end surface, the end sections of said supporting member are more or less brought into contact with said first slot surface and said first symmetric slot surface.

6. A seal device for effecting a seal at a connection space defined between an end surface of one component and an end surface of other component, said seal device comprising:
   a) a supporting member having a first seal protrusion and a second seal protrusion, said first seal protrusion being brought into sealing contact with a second slot surface of said one component, said second seal protrusion being brought into sealing contact with a second symmetric slot surface of said other component;
   b) a retaining member protruding from said supporting member;
   c) a first seal member including a second side portion, a bight-shaped first elastic portion and a first side portion, said second side portion being fixed to a side wall of said retaining member, said first side portion being at an angle relative to a first slot surface of said one component, said first seal member having a sheet form;

d) a second seal member including a second side portion, a bight-shaped first elastic portion and a first side portion, said second side portion being fixed to an other side wall of said retaining member, said first side portion being at an angle relative to a first symmetric slot surface of said other component, said second seal member having a sheet form, said second seal member being arranged symmetrically to said first seal member;

e) a first seal surface being defined at a distal end portion of the outer side surface of said first side portion, said first seal surface being brought into sealing contact with the first slot surface of said one component; and f) a second seal surface being defined at a distal end portion of the outer side surface of said first side portion, said first seal surface being brought into sealing contact with the first symmetric slot surface of said other component;

wherein the end sections of both said second side portions are fixed to said retaining member, and wherein said second side portion of said first seal member and said second side portion of said second-seal member are welded to the side walls of said retaining portion.

7. The seal device as claimed in claim 6, wherein said first seal protrusion and said second seal protrusion have a circular-arc cross-section.

8. The seal device as claimed in claim 6, wherein a plurality of said first seal members and said second seal members are disposed in parallel along the side walls of said retaining member.

9. The seal device as claimed in claim 6, wherein, when a first end surface of said one component is brought into contact with a first symmetric end surface, the end sections of said supporting member are more or less brought into contact with said first slot surface and said first symmetric slot surface.

* * * * *